United States Patent [19]

Kaplan

[11] Patent Number: 4,488,984

[45] Date of Patent: Dec. 18, 1984

[54] SELF-DISPERSING ANTIMONY OXIDE SOLS

[75] Inventor: Morris Kaplan, Houston, Tex.

[73] Assignee: Nalco Chemical Company, Oak Brook, Ill.

[21] Appl. No.: 510,806

[22] Filed: Jul. 5, 1983

[51] Int. Cl.³ .............................................. B01J 20/12
[52] U.S. Cl. .................................. 252/313 R; 252/610; 502/22.60
[58] Field of Search ............... 252/313 R, 309, 411 R, 252/8.1, 316, 313.1, 610; 208/78, 113, 114

[56] References Cited

U.S. PATENT DOCUMENTS

| Number | Date | Name | Class |
|---|---|---|---|
| 3,676,362 | 7/1972 | Yates | 252/309 |
| 3,711,422 | 1/1973 | Johnson et al. | 252/414 |
| 3,718,584 | 2/1973 | Beste et al. | 252/8.1 |
| 3,860,523 | 1/1975 | Petrow et al. | 252/8.1 |
| 3,960,989 | 6/1976 | Petrow et al. | 260/884 |
| 3,994,825 | 11/1976 | Crompton et al. | 252/309 |
| 4,010,104 | 3/1977 | Radlmann et al. | 252/8.1 |
| 4,017,418 | 4/1977 | Crompton et al. | 252/309 |
| 4,028,266 | 6/1977 | Langere et al. | 252/313 R |
| 4,051,064 | 9/1977 | Crompton et al. | 252/309 |
| 4,059,540 | 11/1977 | Crompton et al. | 252/309 |
| 4,110,247 | 8/1978 | Gower et al. | 252/313 R |
| 4,148,712 | 4/1979 | Nielsen et al. | 208/78 |
| 4,148,714 | 4/1979 | Nielsen et al. | 208/114 |
| 4,167,471 | 9/1979 | Bertus et al. | 208/74 |
| 4,178,267 | 12/1979 | McKay | 252/411 R |
| 4,190,552 | 2/1980 | Bertus et al. | 252/411 R |
| 4,193,891 | 3/1980 | McKay | 252/411 R |
| 4,198,317 | 4/1980 | Bertus et al. | 252/411 R |
| 4,207,204 | 6/1980 | McKay et al. | 252/411 R |
| 4,208,302 | 6/1980 | McKay | 252/411 R |
| 4,263,130 | 4/1981 | Bertus et al. | 208/113 |
| 4,279,735 | 7/1981 | Bertus et al. | 208/113 |
| 4,341,655 | 7/1982 | Richardson | 252/313 R |
| 4,343,854 | 8/1982 | Moorman | 428/290 |
| 4,351,741 | 9/1982 | Vogt | 252/313.1 |

Primary Examiner—Ben R. Padgett
Assistant Examiner—T. J. Wallen
Attorney, Agent, or Firm—John G. Premo; Robert A. Miller; Donald G. Epple

[57] ABSTRACT

An aqueous antimony sol composition useful in restoring the activity of metal contaminated molecular sieve cracking catalysts which comprises a major portion of an aqueous antimony sol containing between 1–50% by weight of antimony oxide as $Sb_2O_5$ and between 0.1–10% by weight of a compatible water-soluble surfactant which is capable of producing an oil-in-water emulsion and having an HLB of at least 8.0.

2 Claims, No Drawings

SELF-DISPERSING ANTIMONY OXIDE SOLS

INTRODUCTION

It is now known that molecular sieve cracking catalysts which have been contaminated with such metals as vanadium and nickel can be restored by contacting these contaminated catalysts with antimony-containing compounds and then subsequently subjecting the thus-treated catalysts to elevated temperatures and an oxygen-containing gas whereby revitalization is achieved.

This technology is described in U.S. Pat. No. 3,711,422, the disclosure of which is incorporated herein by reference.

In commercial practice, the antimony compound is usually in the form of an organo metallic antimony compound which is oil-soluble. These compounds are then fed via a slip stream to the liquid hydrocarbon feed going to the fluid catalytic cracking unit. Under the conditions of regeneration, the organo metallic antimony compound decomposes and is oxidized to antimony oxide.

In an effort to reduce the costs of this rejuvenation process, attempts have been made to use aqueous antimony oxide sols to provide a more cost effective source of antimony for treating the contaminated catalysts. These efforts have not been too successful since these aqueous forms of antimony are incompatible with the liquid hydrocarbon streams and, therefore, when used, do not provide a uniform treatment of the contaminated catalysts.

THE INVENTION

The invention comprises a self-dispersing antimony sol which comprises an aqueous antimony sol containing between about 1-50% of antimony oxide expressed as $Sb_2O_5$ and between 0.1-20% by weight of a water-soluble surfactant capable of forming an oil-in-water emulsion. In a preferred embodiment, the amount of emulsifier is within the range of 0.5-3% by weight. Exemplary of such an emulsifying agent is dodecyl benzene sulfonic acid neutralized with morpholine or other amine. The amount of this material ranges between 0.5-2% by weight of the sol. The HLB of the emulsifier is at least 8 and preferably within the range of 8-18. The HLB system for determining types of emulsifier is described in the publication, *The HLB System*, edited and reprinted from Chemmunique, publication of ICI Americas Inc., Wilmington, Del. 1976. When added to the hydrocarbon slip streams fed to contaminated cracking catalysts, the antimony in the emulsion is uniformly distributed throughout the feed.

THE ANTIMONY SOLS

These materials are well known and may be prepared using a number of well known techniques. One method for preparing an antimony trioxide sol is described in U.S. Pat. No. 3,676,362 in which an antimony trichloride is dissolved in an organic solution, treated with $NH_4OH$ to produce $NH_4Cl$ and antimony trioxide. The $NH_4Cl$ is removed and the antimony trioxide is present as a sol in the solution.

Another prior art method of preparing the antimony pentoxide sol is described in U.S. Pat. No. 3,860,523. In this procedure a solution of potassium antimonate (containing 2% by weight of antimony calculated as $Sb_2O_5$) is passed through a hydrogen form cation exchange resin whereby the potassium ions are exchanged for hydrogen ions to yield a pentavalent antimony oxide sol. The low concentration of antimony pentoxide obtained by this process requires an evaporation step to obtain a high concentration of antimony.

Other prior art methods are described which show that antimony pentoxide may be formed from antimony trioxide by treating the antimony trioxide with HCl to form antimony trichloride which, in turn, is oxidized to antimony pentoxide by reacting the antimony trichloride with hydrogen peroxide to form hydrates of antimony pentoxide.

THE WATER-SOLUBLE EMULSIFYING AGENTS

A variety of surfactants generically described as oil-in-water emulsifying agents, dispersants, or wetting agents, may be used. Routine experiments can determine the type and amount of surfactant that may be used. These surfactants are further characterized in that they must be water-soluble and must not destabilize the sol under conditions of long-term storage. As indicated, a preferred emulsifying agent is dodecyl benzene sulfonic acid neutralized in the sol with morpholine or other amine.

A typical composition of the invention is a 1-50% antimony oxide sol which contains 1% by weight of the amine salt of dodecyl benzene sulfonic acid. The amount of amine in the salt makes the pH of the sol about 8.4.

This material, when added to a typical catalytic cracking unit slip stream such as light cycle oil, forms a uniformly distributed antimony oxide therethroughout. The same sol without the emulsifier forms a course dispersion that is not distributed throughout the light cycle oil.

The products of the invention can be added into any hydrocarbon liquid prior to being injected into a hydrocarbon stream going to a fluid catalytic cracking unit. The hydrocarbons can be a hydrocarbon liquid from a side stream coming from the fluid catalytic cracking unit or other hydrocarbon liquids illustrated by, but not limited to, feed oils, gas oils, gasoline, diesel fuel oils, kerosenes or bottom recycle oils. The specific addition points, in addition to a side cut slip stream going to a fluid catalytic cracking unit, would be blend tanks on the fluid catalytic cracking unit. Other central pumping points in the refinery going to the fluid catalytic cracking unit(s) can serve as an addition point for adding the antimony sol emulsions.

When emulsions of the type described above are added in the manner prescribed, the antimony particles contained in the sol are uniformly dispersed into the hydrocarbon liquid. It is believed that when the starting oil-in-water emulsions are added to large volumes of hydrocarbon liquids, that in all probability a phase inversion occurs and the antimony sol becomes dispersed in the feed stream, most probably in the form of a water-in-oil emulsion.

To illustrate the above phenomenon, when an emulsion of the type described above would be added to a large quantity of a light cycle oil with good mixing, the antimony contained in the starting emulsion would be uniformly dispersed in the light cycle oil.

Having thus described my invention, I claim:

1. An aqueous antimony sol composition useful in restoring the activity of metal contaminated molecular sieve cracking catalysts which comprises a major portion of an aqueous antimony sol containing between 1–50% by weight of antimony oxide as $Sb_2O_5$ and between 0.1–10% by weight of a compatible water-soluble surfactant which is capable of producing an oil-in-water emulsion and having an hydrophile-lipophile-balance of at least 8.0.

2. The composition of claim 1 where the water-soluble surfactant is dodecyl benzene sulfonate neutralized with morpholine.

* * * * *